(12) United States Patent
Landtiser et al.

(10) Patent No.: US 10,836,682 B2
(45) Date of Patent: Nov. 17, 2020

(54) METHODS AND APPARATUS FOR CONDUCTING HEAT EXCHANGER BASED REACTIONS

(71) Applicant: Melior Innovations, Inc., Houston, TX (US)

(72) Inventors: Richard Landtiser, Naperville, IL (US); Wen Liao, Clifton Park, NY (US); Connor Kilgallen, Amsterdam, NY (US); Douglas Dukes, Troy, NY (US); Isabel Burlingham, Troy, NY (US)

(73) Assignee: Melior Innovations, Inc., Houston, TX (US)

(*) Notice: Subject to any disclaimer, the term of this patent is extended or adjusted under 35 U.S.C. 154(b) by 71 days.

(21) Appl. No.: 16/041,801

(22) Filed: Jul. 22, 2018

(65) Prior Publication Data
US 2019/0233336 A1    Aug. 1, 2019

Related U.S. Application Data

(60) Provisional application No. 62/535,858, filed on Jul. 22, 2017.

(51) Int. Cl.
*C04B 35/00* (2006.01)
*C04B 35/565* (2006.01)
(Continued)

(52) U.S. Cl.
CPC ............ *C04B 35/571* (2013.01); *C04B 35/52* (2013.01); *C04B 35/5603* (2013.01);
(Continued)

(58) Field of Classification Search
CPC ....... C04B 35/571; C04B 35/52; C04B 35/58; C04B 35/589; C04B 35/5603; C04B 2235/80; C04B 2235/3826; C04B 2235/383; C04B 2235/483; C08G 77/20; C08G 77/50; C08G 77/12; C08L 83/04; C08K 5/01; F28D 7/024; F28D 7/1607; F28D 9/0043; F28D 15/02; F28D 1/10
See application file for complete search history.

(56) References Cited

U.S. PATENT DOCUMENTS 5,153,295 A  10/1992  Whitmarsh
6,652,627 B1 11/2003  Tonkovich
(Continued)

FOREIGN PATENT DOCUMENTS

WO  WO 2007/070957  6/2007
WO  WO 2018/125861  7/2018
WO  WO 2018/027006  2/2019

OTHER PUBLICATIONS

Vakifahmetoglu et al. "Porous polymer derived ceramics," Materials Science and Engineering R 106 (2016) 1-30. (Year: 2016).*
(Continued)

*Primary Examiner* — Kara B Boyle
(74) *Attorney, Agent, or Firm* — Glen P. Belvis; Belvis Law, LLC.

(57) ABSTRACT

Methods, apparatus and systems using heat exchanger reactors to form polymer derived ceramic materials, including methods for making polysilocarb (SiOC) precursors.

12 Claims, 10 Drawing Sheets

(51) Int. Cl.

| | | |
|---|---|---|
| C04B 35/571 | (2006.01) | |
| C04B 35/56 | (2006.01) | |
| C08G 77/12 | (2006.01) | |
| C04B 35/52 | (2006.01) | |
| C04B 35/58 | (2006.01) | |
| C04B 35/589 | (2006.01) | |
| C08G 77/20 | (2006.01) | |
| C08L 83/04 | (2006.01) | |
| C08G 77/50 | (2006.01) | |
| C08K 5/01 | (2006.01) | |
| F28D 7/02 | (2006.01) | |
| F28D 7/16 | (2006.01) | |
| F28D 9/00 | (2006.01) | |
| F28D 15/02 | (2006.01) | |
| F28F 1/10 | (2006.01) | |

(52) U.S. Cl.
CPC ............ *C04B 35/58* (2013.01); *C04B 35/589* (2013.01); *C08G 77/12* (2013.01); *C08G 77/20* (2013.01); *C08G 77/50* (2013.01); *C08K 5/01* (2013.01); *C08L 83/04* (2013.01); *F28D 7/024* (2013.01); *F28D 7/1607* (2013.01); *F28D 9/0043* (2013.01); *F28D 15/02* (2013.01); *F28F 1/10* (2013.01); *C04B 2235/383* (2013.01); *C04B 2235/3826* (2013.01); *C04B 2235/483* (2013.01); *C04B 2235/80* (2013.01)

(56) References Cited

U.S. PATENT DOCUMENTS

| 8,961,840 | B1 | 2/2015 | Hill |
|---|---|---|---|
| 2004/0009865 | A1 | 1/2004 | Nair |
| 2005/0280607 | A1 | 9/2005 | Ferencz |
| 2006/0069176 | A1 | 3/2006 | Bowman |
| 2006/0106158 | A1 | 5/2006 | Dewanjee |
| 2007/0172535 | A1 | 7/2007 | Fridley |
| 2009/0202732 | A1 | 8/2009 | Kruger |
| 2010/0048959 | A1 | 2/2010 | Sigl |
| 2012/0090819 | A1 | 4/2012 | Christiano |
| 2012/0190597 | A1 | 7/2012 | Chatterjee |
| 2012/0226375 | A1 | 9/2012 | Brown |
| 2012/0255706 | A1 | 10/2012 | Tadoyon |
| 2013/0036713 | A1 | 2/2013 | Daute |
| 2014/0264984 | A1 | 9/2014 | Purolite |
| 2014/0274658 | A1 | 9/2014 | Melior |
| 2014/0323364 | A1 | 10/2014 | Melior |
| 2014/0326453 | A1 | 11/2014 | Melior |
| 2014/0343220 | A1 | 11/2014 | Melior |
| 2015/0175750 | A1 | 6/2015 | Melior |
| 2015/0252170 | A1 | 9/2015 | Melior |
| 2016/0280607 | A1 | 9/2016 | Melior |
| 2017/0050337 | A1 | 2/2017 | Melior |
| 2018/0057416 | A1 | 3/2018 | Melior |
| 2019/0345070 | A1 | 11/2019 | Melior |

OTHER PUBLICATIONS

Fukushima et al. "Silicon Carbide-based foams from direct blowing of polycarbosilane," Journal of the European Ceramic Society 32 (2012) 503-510 (Year: 2012).*
Erb et al., "Additive and pyrolysis atmosphere effects on polysiloxane-derived porous SiOC ceramics," Journal of the European Ceramic Society 37 (2017) 4547-4557 (Year: 2017).*
Du et al., "Preparation and structural evolution of SiOC preceramic aerogel during high-temperature treatment," Ceramics International 44 (2018) 563-570. (Year: 2018).*
Sep. 27, 2016, PCT, PCT/US2016/042347 Search Report.
Sep. 27, 2016, PCT, PCT/US2016/042347 Opinion.
Mar. 24, 2016, PCT, PCT/US2016/014245 Search Report.
Mar. 24, 2016, PCT, PCT/US2016/014245 Opinion.
Jul. 6, 2018, EPO, Appl. No. 16740729.5 Search Report.
Jul. 6, 2018, EPO, Appl. No. 16740729.5 Opinion.
Jul. 10, 2018, PCT, PCT/US2017/068404 Search Report.
Jul. 10, 2018, PCT, PCT/US2017/068404 Opinion.
Dec. 4, 2018, PCT, PCT/US2018/043204 Opinion and Search Report.

* cited by examiner under 35 U.S.C. § 119(e)(1) the benefit of U.S. provisional application Ser. No. 62/535,858 filed Jul. 22, 2017, the entire disclosure of which are incorporated herein by reference.

METHODS AND APPARATUS FOR CONDUCTING HEAT EXCHANGER BASED REACTIONS

This application claims under 35 U.S.C. § 119(e)(1) the benefit of U.S. provisional application Ser. No. 62/535,858 filed Jul. 22, 2017, the entire disclosure of which are incorporated herein by reference.

BACKGROUND OF THE INVENTION

Field of the Invention

The present inventions relate to the use of heat exchangers to conduct chemical reactions, including the reactions of silicon containing materials, and in particular for conducting reactions of polymer derived ceramic precursors compositions and materials, including polysilocarb materials. Polysilocarb precursor materials and reactions for making those materials are disclosed and taught in U.S. Pat. Nos. 9,815,952, 9,828,542, 9,815,943, and US Patent Publication Nos. 2015/0175750 and 2015/0252170, the entire disclosures of each of which are incorporated herein by reference.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure, this would include viscosities.

Generally, the term "about" and the symbol "~" as used herein unless stated otherwise is meant to encompass a variance or range of ±10%, the experimental or instrument error associated with obtaining the stated value, and preferably the larger of these.

As used herein, unless specified otherwise the terms %, weight % and mass % are used interchangeably and refer to the weight of a first component as a percentage of the weight of the total, e.g., formulation, mixture, preform, material, structure or product. The usage X/Y or XY indicates weight % of X and the weight % of Y in the formulation, unless expressly provided otherwise. The usage X/Y/Z or XYZ indicates the weight % of X, weight % of Y and weight % of Z in the formulation, unless expressly provided otherwise.

As used herein, unless specified otherwise "volume %" and "% volume" and similar such terms refer to the volume of a first component as a percentage of the volume of the total, e.g., formulation, mixture, preform, material, structure or product.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing and unfulfilled need for apparatus and commercially scalable methods for making polymers and other materials, including polymer derived ceramic precursors and in particular polysilocarb precursors. The present inventions, among other things, solve these needs by providing the compositions, materials, articles of manufacture, devices and processes taught, disclosed and claimed herein.

Thus, there is provide a system for and method of making a polymer derived ceramic precursor, including forming a polymer derived ceramic precursor using a heat exchanger reactor.

There is provided these systems and methods having one or more of the following features: wherein the polymer derived ceramic precursor comprises a polysilocarb; wherein the method comprises reacting a first polysilocarb precursor with an organic crosslinking agent; wherein the organic crosslinking agent is silicon free; and wherein the reactants are methyl-hydrogen polysiloxane and dicyclopentadiene.

Further there is provided a system for and method of making a polymer derived ceramic precursor, the having: preheating methyl-hydrogen polysiloxane and dicyclopentadiene to 40° C. in separate holding tanks; transferring through an inline static mixer to heat exchange reactor apparatus; adding 1000 ppm Pt Ashby's catalyst in xylenes (0.0339 lb/min) to the heat exchanger reactor apparatus; raising the temperate to 60° C.

Moreover, there is provided the methods and systems having one or more of the following features: wherein the heat exchanger apparatus comprises a shell and tube heat exchanger; wherein the heat exchanger apparatus comprises a plate heat exchanger; wherein the heat exchanger apparatus comprises a plate and shell heat exchanger; wherein the heat exchanger apparatus comprises an adiabatic heat exchanger; wherein the heat exchanger apparatus comprises a plate fin heat exchanger; wherein the heat exchanger apparatus comprises a pillow plate heat exchanger; wherein the heat exchanger apparatus comprises a phase change heat exchanger; wherein the heat exchanger apparatus comprises a direct contact heat exchanger; wherein the heat exchanger apparatus comprises a microchannel heat exchanger; wherein the heat exchanger apparatus comprises a spiral heat exchanger; wherein the heat exchanger apparatus comprises a regenerative heat exchanger; wherein the heat exchanger apparatus comprises a falling film evaporator; wherein the heat exchanger apparatus comprises a wiped film heat exchanger reactor; wherein the heat exchanger apparatus comprises a shell and tube heat exchanger; wherein the heat exchanger apparatus comprises a plate heat exchanger; wherein the heat exchanger apparatus comprises an adiabatic heat exchanger; and, wherein the heat exchanger apparatus comprises a direct contact heat exchanger.

Yet additionally, there is provided a system for and method of making a polymer derived ceramic precursor, including: preheating n-octylhexamethylcyclotetrasiloxane and sym-tetramethyldisiloxane to 40° C. in separate holding tanks; pumping each material in a 20:1 (n-octylhexamethylcyclotetrasiloxane:sym-tetramethyldisiloxane) ratio through an inline static mixer along with 1% sulfuric acid into a heat exchange apparatus, containing mixing zones, heated to 80° C.; wherein the pump rate is adjusted to maintain a resonance time of 60 min; cooling the reaction product to room temperature; and, filtering the reaction product through celite; whereby a mixture of cyclosiloxanes and linear polymers is obtained in a quantitative yield.

Further there is provided these methods and systems having one or more of the following features: wherein the linear polymers have an approximate formula of $HMe_2SiO(Me_2SiO)_{40}(OctylMeSiO)_{40}SiMe_2H$ can be obtained through further processing.

Still additionally, there is provided a system for and method of making caprolactone, the method comprising: forming a solution of methanol and stannous 2-ethylhexanoate in xylenes at 60° C. in a first heat exchanger apparatus; adding an initiator a catalyst or both to the solution in the first heat exchanger apparatus, wherein the initiator/catalyst ratio ranges from 1 to 50; whereby the molecular weight of the reaction product is controlled; mixing the product from the first heat exchanger apparatus in a static mixer with caprolactone to form a second mixture; injecting the second mixture into a second heat exchange reactor at 100° C.; the second reactor having a resonance time of 4-6 hours; transferring the reaction product of the second heat exchanger apparatus to a third heat exchange apparatus, wherein, the temperature is reduced to a temperature of 0° C.

The forgoing methods, wherein at least one of the heat exchanger apparatus comprises a wiped film heat exchanger reactor.

DESCRIPTION OF THE PREFERRED EMBODIMENTS

Figure 1:
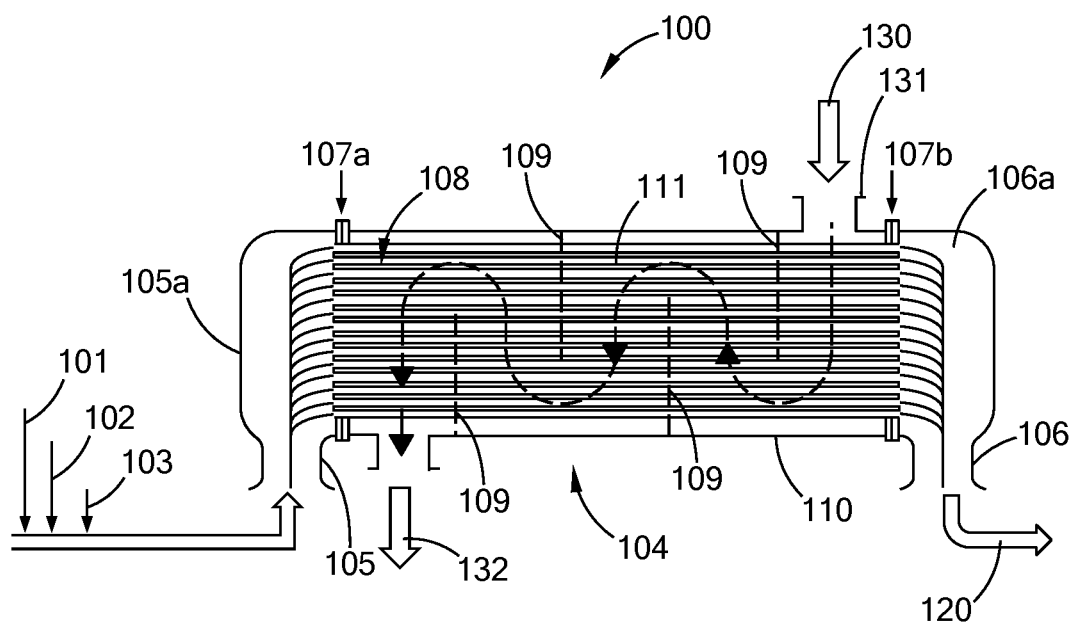
FIG. 1 is a cross sectional view of an embodiment of a heat exchanger system and method in accordance with the present inventions.

In general, the present inventions relate to apparatus and processes to preferably make commercial and large volumes of chemicals and materials, including silicon based materials, and in particular, polymer derived ceramic (PDC) materials and precursors.

In general, the present inventions relate to processes, systems and apparatus for reaching and making unique and novel silicon (Si) based materials, including polyorganic materials, that are typically and preferably easy to manufacture, handle and have surprising and unexpected properties and applications. These silicon based materials have applications and utilizations as a liquid material, a cured material (e.g., a plastic), a preceramic, and a pyrolized material (e.g., a ceramic).

Polymer derived ceramics (PDC) are ceramic materials that are derived from, e.g., obtained by, the pyrolysis of polymeric materials. These materials are typically in a solid or semi-solid state that is obtained by curing an initial liquid polymeric precursor, e.g., PDC precursor, PDC precursor formulation, precursor batch, and precursor. The cured, but unpyrolized, polymer derived material can be referred to as a preform, a PDC preform, the cured material, and similar such terms. Polymer derived ceramics may be derived from many different kinds of precursor formulations, e.g., starting materials, starting formulations. PDCs may be made of, or derived from, carbosilane or polycarbosilane (Si—C), silane or polysilane (Si—Si), silazane or polysilazane (Si—N—Si), silicon carbide (SiC), carbosilazane or polycarbosilazane (Si—N—Si—C—Si), siloxane or polysiloxanes (Si—O), to name a few.

Embodiments of the present inventions preferably use, are based upon or constitute PDCs that are "polysilocarb" materials, e.g., materials containing silicon (Si), oxygen (O) and carbon (C), and embodiments of such materials that have been cured, and embodiments of such materials that have been pyrolized and embodiment of such materials that have been convered to SiC. The polysilocarb materials may be of high and exceptionally high purity. The polysilocarb materials may also contain other elements. Polysilocarb materials are made from one or more polysilocarb precursor formulation or precursor formulation. The polysilocarb precursor formulation contains one or more functionalized silicon polymers, or monomers, non-silicon based cross linkers, as well as, potentially other ingredients, such as for example, inhibitors, catalysts, fillers, dopants, modifiers, initiators, reinforcers, fibers, particles, colorants, pigments, dies, the same or other PDCs, ceramics, metals, metal complexes, and combinations and variations of these and other materials and additives. Silicon oxycarbide materials, SiOC compositions, and similar such terms, unless specifically stated otherwise, refer to polysilocarb materials, and would include liquid materials, solid uncured materials, cured materials, ceramic materials, and combinations and variations of these.

Examples of PDCs, PDC formulations, potential precursors, and starting materials, and apparatus and methods for making these materials, that can be used, or adapted and improved upon employing the teachings of this specification to be used, in embodiments of the present inventions are found, for example, in US Patent Publication Nos. 2014/0274658, 2014/0323364, 2015/0175750, 2016/0207782, 2016/0280607, 2017/0050337, 2008/0095942, 2008/0093185, 2007/0292690, 2006/0069176, 2006/0004169, and 2005/0276961, and U.S. Pat. Nos. 9,499,677, 9,481,781, 8,742,008, 8,119,057, 7,714,092, 7,087,656, 5,153,295, and 4,657,991, and the entire disclosures of each of which are incorporated herein by reference.

Formulations for various polysilocarbs are taught and disclosed in U.S. Pat. Nos. 9,499,677, 9,481,781 and US Patent Publication Nos. 2014/0274658, 2014/0323364, 2015/0175750, 2016/0207782, 2016/0280607, 2017/0050337, the entire disclosure of each of which are incorporated herein by reference.

Typically, and preferably, the polysilocarb precursor formulation is initially a liquid. The liquid precursors are cured to a solid or semi-solid SiOC. The solid or semi-solid SiOC is then pyrolized to a ceramic SiOC. In an embodiment the SiOC ceramic may be further transformed to SiC.

In embodiments of the present inventions heat exchanger reaction apparatus and systems are used to make PDC precursors, formulations and liquids. In preferred embodiments of the present inventions the heat exchanger apparatus and systems are used to make polysilocarb precursors, polysilocarb formulations, binders and liquid polysiclocarb starting materials, and combinations and variations of these.

In an embodiment a heat exchanger reactor assembly is used to create PDC formulations and precursors of high purity. For example high purity SiOC material that has a purity of from about 99.9% to about 99.99999%, from about 99.99% to about 99.999%, from about 99.999% to about 99.9999%, at least about 99.9%, at least about 99.99%, at least about 99.999%, and least about 99.9999% and at least about 99.99999% or greater. Further, it is noted that embodiments of the present invention include materials of any purity level, including lower levels of purity, such as 99.0%, 95%, 90% and lower.

In embodiments the heat exchanger reaction systems and apparatus can be used to perform the following reactions: hydrosilylation; sol-gel processes; silane functionalization of particles; silicone re-equilibriation; radical polymerization; cationic polymerization; anionic polymerization; ring opening polymerization; reversible addition-fragmentation chain transfer polymerization (RAFT); condensation polymerization; metathesis polymerization and combinations and variations of these.

In an embodiment one, two, three or more heat exchanger reactors can be operated in serial. This embodiment can be used to address slower reactions, reactions were an intermediate needs to be held or otherwise processed before the reaction continues, and other activities where the serial processing of the components is useful. The use of reactors in serial, i.e., the product from one being feed into the next, etc., has application for slow reactions that require long residence time, as well as, among other things, multi-step reactions, e.g. hydrosilation in the first heat exchanger and ring opening polymerization in the second heat exchanger, etc. Thus, any of the reaction pathways describe in this specification could be preformed in a reaction heat exchanger system have a series of heat exchangers in series. It should also be recognized that parallel heat exchanges may also be used. Further parallel heat exchanges can be one section, or unit, of a series of serially connected heat exchanges forming a multi until reaction heat exchanger system.

Reaction heat exchanger apparatus and systems that can be used to perform embodiments of the present processes and methods would include the following.

Turning to FIG. 1, there is shown a system and method 100 for reacting starting materials in a heat exchanger to make an SiOC precursor. A first infeed material 101, a second infeed material 102 and a third infeed material 103, are feed into a heat exchanger reactor 104. The heat exchanger reactor has an outer housing 110 or shell that forms a cavity 111 having tube sheets 107a and 107b at the ends of the housing 110, and forming the ends of the cavity 111.

Contained within the outer housing 110 are a bundle of heat exchanger tubes 108. The reactants, or infeed materials, are reacted within the heat exchanger tubes. The heat exchanger reactor 104 has a reactant infeed 105 an reaction product outlet 106. The reaction infeed 105 is connected to the bundle of heat exchanger tubes 108, and the heat exchanger tubes, by way of an inlet chamber 105a and the tube sheet 107a. The tube bundle 108, and the heat exchanger tubes, is connected through a tube sheet 107b to an outlet chamber 106a, which is connected to an outlet 106. The product 120, of the reaction that takes place within the heat exchange tubes of the bundle 108, exits the heat exchanger reactor 104 through the outlet 106.

Temperature control fluid 130, which can for example be a liquid, such as water, having a predetermined temperature, is feed into the cavity 111 through inlet 131. The temperature control fluid 130 flows around the outside of the heat exchanger tubes in the bundle 108, along a temperature control fluid path, and exits the heat exchanger 104 by fluid outlet 132. The flow path of the temperature control fluid 130 can further be controlled or directed by a series of baffles, e.g., 109.

In this manner the temperature control fluid 130, flows around the outside of the tubes, and can, depending upon its temperature, and the nature of the reaction taking place within the tubes (e.g., exothermic or endothermic) add heat to the reaction, e.g., raise the temperature of the reactants, remove heat from the reaction, e.g., cool the temperature of the reactants, and combinations and variations of these (e.g., different or multiple temperature control fluid paths).

In an embodiment the first reactant material is an SiOC precursor. The precursor may be a methyl terminated hydride substituted polysiloxane, which can be referred to herein as methyl hydrogen (MH), having the formula shown below.

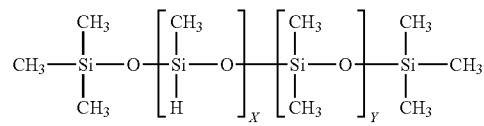

The MH, for example, may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero. In a preferred embodiment the first material infeed 100 is MHF having less than 99% "Y".

In this embodiment the second reactant material is a cross linker, or cross linking agent. For example, in a preferred embodiment the second reactant material is a non-silicon containing organic material, such as DCPD.

In this embodiment the third material is a cataylist, for example Ashby's catalyst.

In an embodiment, this MHF/DCPD/Catalyst reaction is conducted in a heat exchanger reactor. In this embodiment of the reactor, the tube bundle has 400 tubes, each having an inner diameter of 1.4 cm and a length of 20 feet (6.1 meters). The distance between the tubes, within the cavity, is 1.5 inches (3.81 cm). The outer diameter of the housing is 3.3 feet (1 meter). The cooling water flow rate is 89 gpm (336.9 L/m). The inlet temperature of the water is 40° C. and the outlet temperature of the water is 42° C. The reaction time, within the tubes, is 1 hr. The three infeed materials are mixed with an in-line static mixer and then distributed and feed to the reaction tubes through the shell plate. The flow of the temperature control fluid (e.g., shell or cavity fluid) is counter flow to the flow of the reactants.

Turning to FIGS. 2 through 13 there are provided further examples of embodiments of various types, or configurations, of heat exchanges that can be used as reaction heat exchanges to conduct embodiments of the present heat exchanger reactions.

Figure 2:
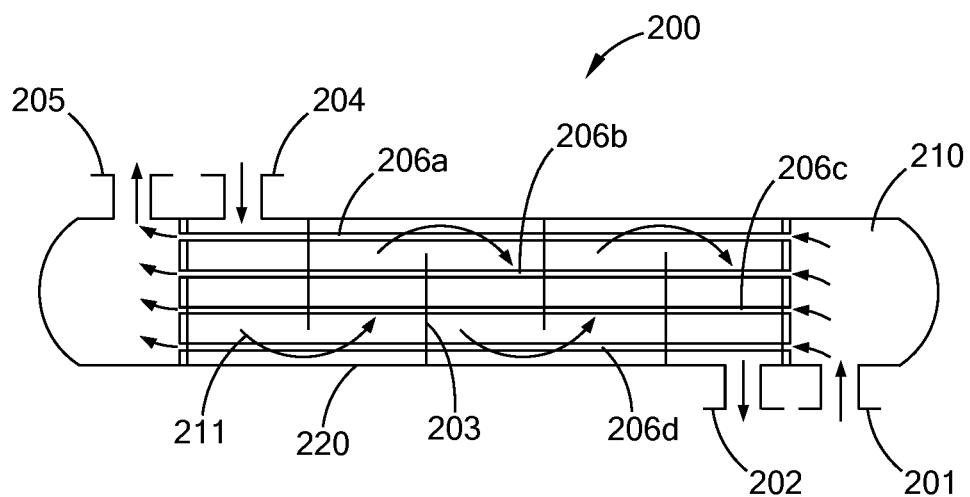
FIG. 2 is a cross sectional view of an embodiment of a heat exchanger system for use in accordance with the present inventions.

Turning to FIG. 2 that is shown an embodiment of a shell and tube heat exchanger reactor 200 consisting of a series of small diameter, thin-walled tubes 206a, 206b, 206c, 206d, set inside a cylindrical shell 220. One fluid is passed through the small tubes, along flow 201, while the other flows through the large shell, along flow path 211. The shell 220 has shell fluid inlet 204 and outlet 202. The shell 220 has tube fluid inlet 201 and outlet 205. Heat exchange occurs between the two fluids, which can be configured in either a co- or counter-flow setup. Other customizations can be made to shell and tube heat exchangers, such as baffles, e.g., 203, finned tubes, tube design, and shell design, in order to facilitate more effective heat exchange. The shell fluid, the tube fluid or both can be or contain the reactants, e.g., reaction fluids. Shell and tube heat exchangers are often used in high-pressure and temperature applications (pressures above 30 bar and temperatures above 260° C.) due to the robustness of their design.

Figure 3A:
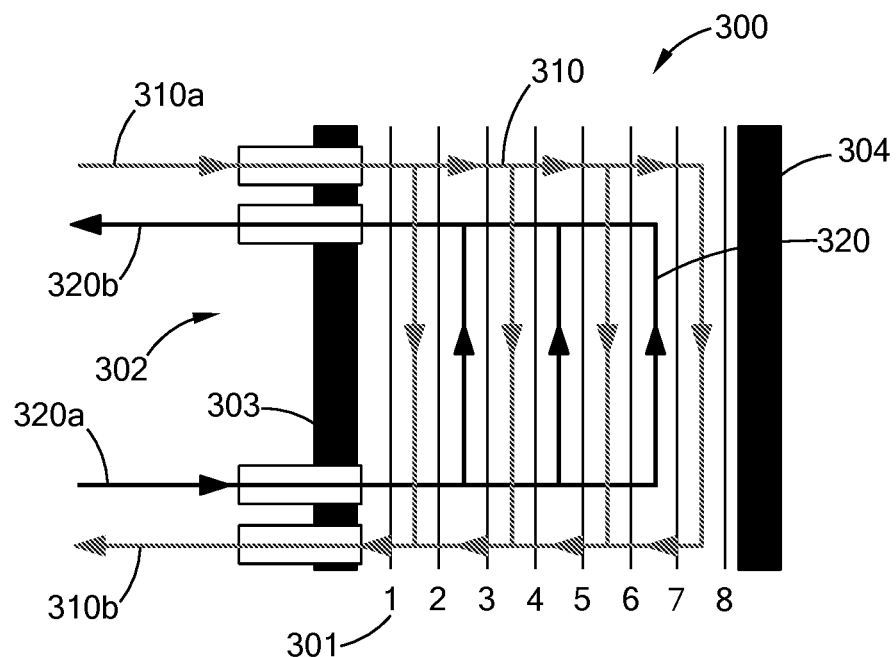
FIG. 3A is a schematic of an embodiment of a single-pass plate heat exchanger arrangement for use in accordance with the present inventions.
Figure 3B:
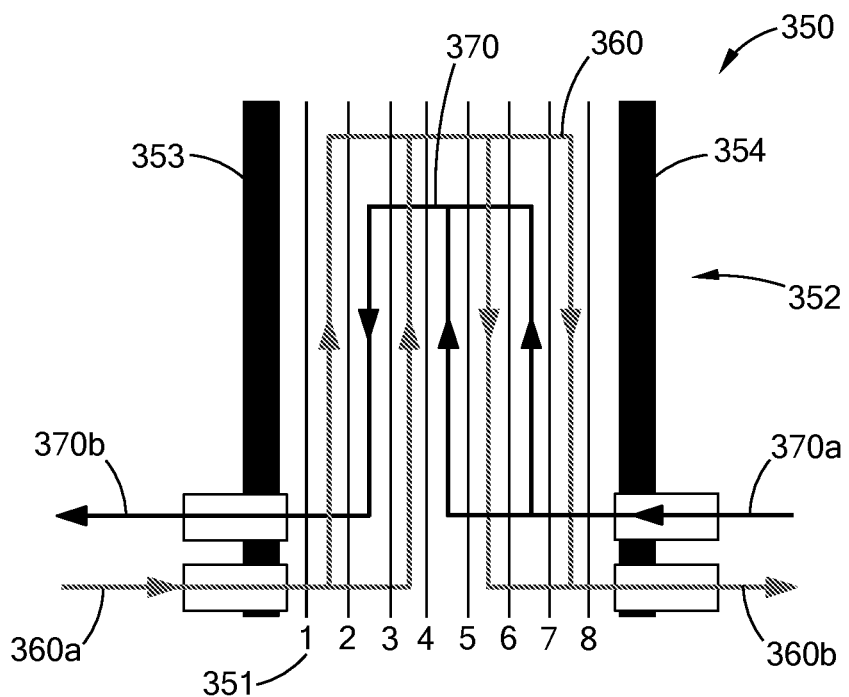
FIG. 3B is a schematic of an embodiment of a multi-pass plate heat exchanger arrangement for use in accordance with the present inventions.

Turing to FIGS. 3A and 3B there is shown a single pass plate reaction heat exchanger 300 and a multi-pass reaction heat exchanger 350. The reactors 300, 350 are made up of a series of corrugated plates, e.g., 301, 351, which are held together by an external frame or other mechanical fastener 302, 352. The external frame, 302, 303 have a fixed end 303, 353 and a movable end 304, 354 respectively. The exchanges have two fluid paths, with each path having an inlet and an outlet. Inlet 310a and outlet 310b form a first, e.g., hot fluid flow path 310 of reactor 300. Inlet 320a and outlet 320b form the second, e.g., cold fluid flow path 320 of reactor 300. Inlet 360a and outlet 360b form hot fluid flow path 360 of exchanger 350. Inlet 370a and outlet 370b form cold fluid flow path 370 of exchanger 350. The two fluids alternate which plates they flow through, and the sealing between plates ensures that no mixing of the fluid occurs. Heat exchange takes place through the thin-walled plates as the cross- or counter-current flowing fluids pass each other. The plates in these heat exchangers are sealed most commonly by gaskets, brazing, welding, or a combination of gaskets and welding. The first fluid, the second fluid or both can be or contain the reactants, e.g., reaction fluids. Plate heat exchangers are ideal in applications where small size is necessary, and high temperature and pressure capability is not required.

Figure 4:
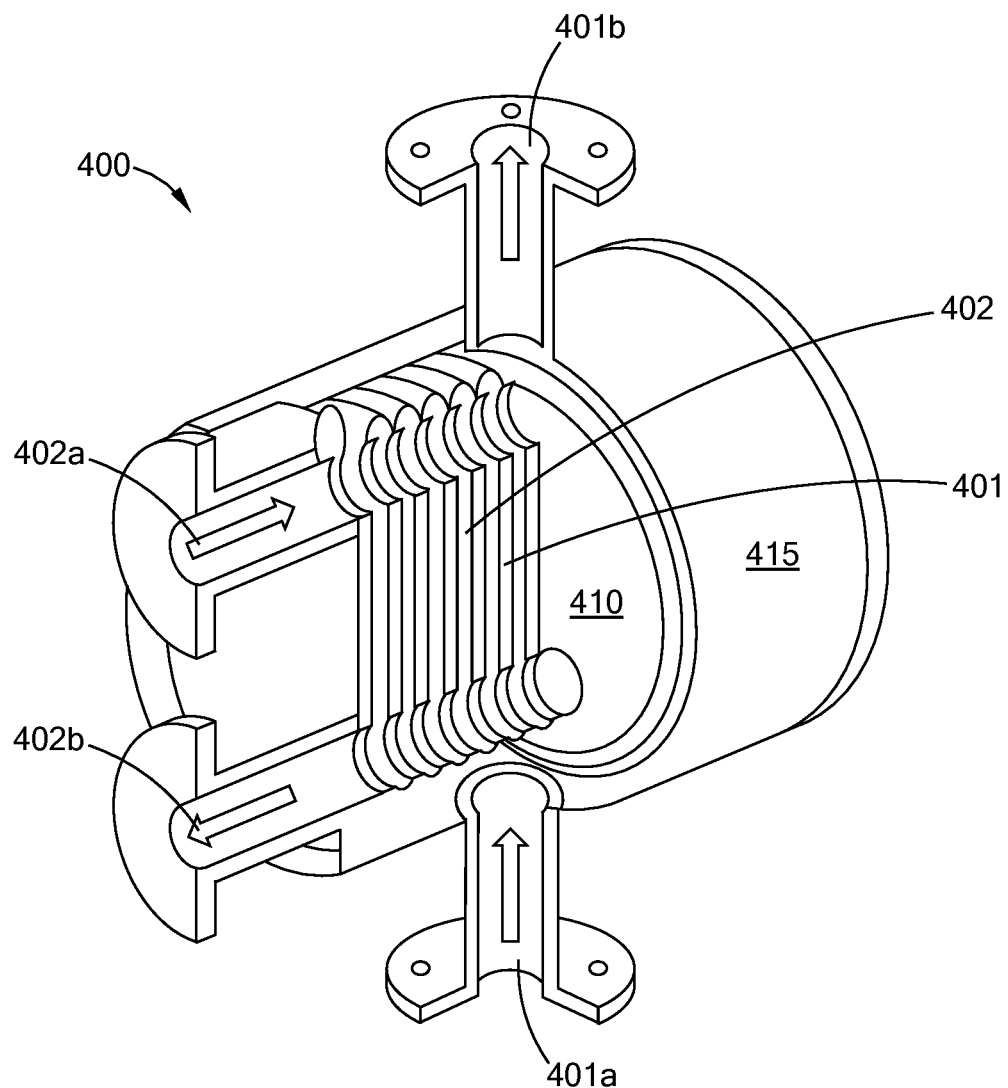
FIG. 4 is a perspective partial cross sectional view of an embodiment of a plate and shell heat exchanger for use in accordance with the present inventions.

Turing to FIG. 4 there is shown an embodiment of a plate and shell heat exchanger reactor 400. Reactor 400 is a combination of shell and tube heat exchangers, and plate heat exchangers. Fully welded plate packs 410 are used in place of the tubes traditionally employed in a shell and tube heat exchanger. Heat exchange takes place between the two fluids as one flows through the plates (along flow path 402 having inlet 402a and outlet 402b) while the other flows through the larger shell 415 (along flow path 401 having inlet 401a and outlet 401b). The first fluid, the second fluid or both can be or contain the reactants, e.g., reaction fluids. Plate and shell heat exchangers incorporate both the high heat and pressure capabilities of a shell and tube setup, as well as the space saving design and high heat exchange rates of plate heat exchangers.

Figure 5:
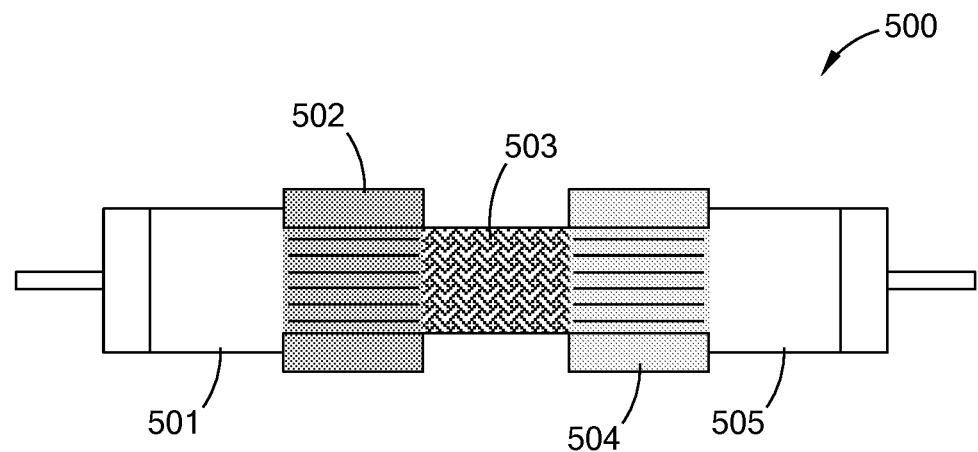
FIG. 5 is a schematic of an embodiment of an adiabatic heat exchanger for use in accordance with the present inventions.

Turning to FIG. 5 there is shown an embodiment of an adiabatic heat exchanger reactor 500. This reactor 500 utilizes a fluid or solid to store and hold heat, which then gets moved to the opposite side of the heat exchanger where the heat is released. The exchanger 500 has an adiabatic compression space 501, a cooler 502, a regenerator 503, a heater 504 and an adiabatic expansion space 505. The intermediate carrying material is most commonly moved using either a large wheel with fine threads or as a fluid. Typically in these heat exchangers, there is minimal and essentially no heat lost to the environment. The intermediate carry material can be the reaction fluid.

Figure 6:
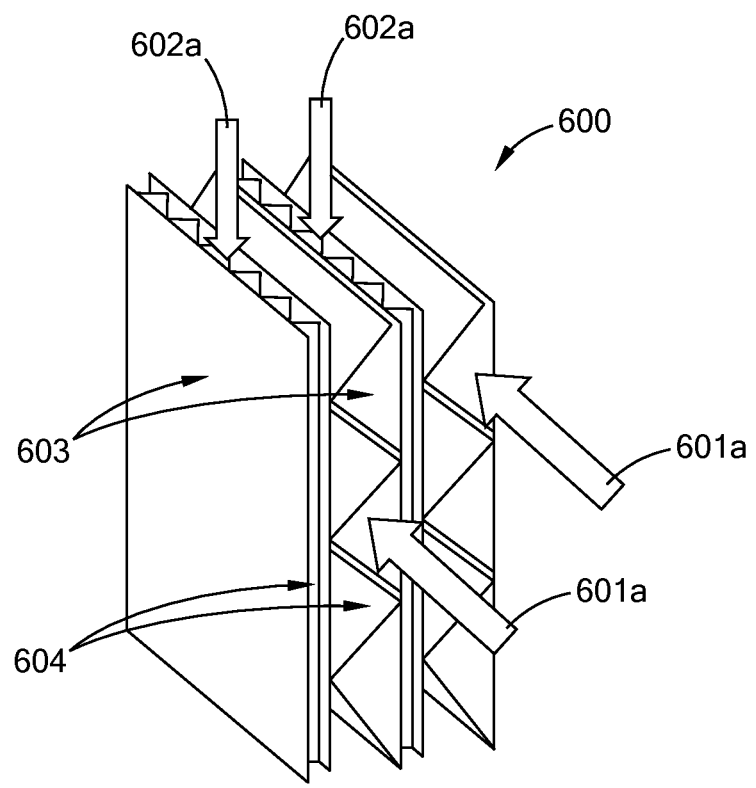
FIG. 6 is a perspective view of an embodiment of a plate fin heat exchanger for use in accordance with the present inventions.

Turning to FIG. 6 there is shown an embodiment of a plate fin heat exchanger reactor 600. This reactor 600 is an evolution of traditional plate heat exchangers. They are constructed and operate much the same, however they contain a system of fins 604 between the plates 603. The fluids, 601a and 602a, can flow in either a cross- or counter-flow configuration and the fins can be of any shape arranged in any configuration. Heat exchange occurs through the plates and fins as the two fluids are passed by each other through the plates. The first fluid, the second fluid or both can be or contain the reactants, e.g., reaction fluids. Plate fin heat exchangers are often employed in low temperature and pressure applications, but are able to withstand higher pressures when welded or brazed together.

Pillow plate reaction heat exchangers use similar mechanics to traditional plate heat exchangers, however the construction differs. Pillow plate heat exchangers are constructed from thin metal which is spot or pattern welded to a thicker material, and then the resulting space is pressurized and expanded to create a path for the heat exchange fluid to flow. The heat exchange occurs through the puffed thin metal sheet that separates the two fluids. The first fluid, the second fluid or both can be or contain the reactants, e.g., reaction fluids.

Figure 7:
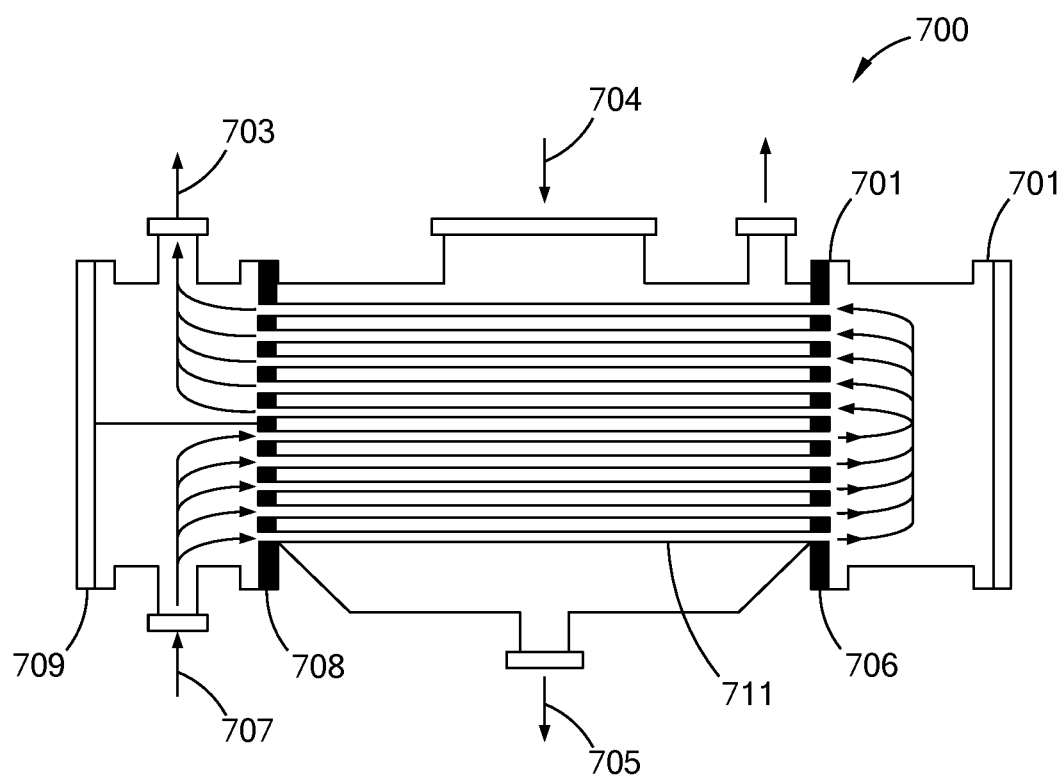
FIG. 7 is a cross sectional view of an embodiment of a phase change heat exchanger for use in accordance with the present inventions.

Turing to FIG. 7 there is shown an embodiment of a phase change heat exchanger reactor 700. The reactor 700 has a fluid inlet 703 and a fluid outlet 707, flanges 701 and tube sheets 706, 708, tubes, e.g., 711, a vapor inlet 704 and a condensate outlet 705, and a flange cover plate 709. Phase change heat exchangers are designed to either vaporize or condense one of the heat exchange fluids. Their design is often based off of other conventional heat exchangers, with modifications to accommodate the desired phase change. Modified shell and tube heat exchangers are commonly used since they are able to withstand high temperatures and pressures. The first fluid, the second fluid (or vapor) or both can be or contain the reactants, e.g., reaction fluids. The heat exchange, in these cases, occurs between a vapor and a liquid, one of which is flowing through the tubes and one of which is flowing through the shell.

Figure 8:
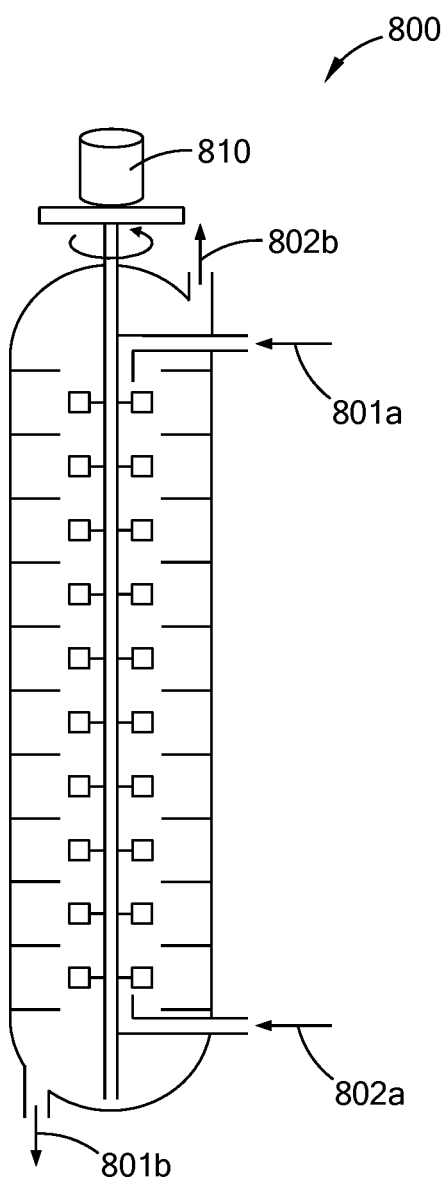
FIG. 8 is a cross sectional view of an embodiment of a direct contact heat exchanger for use in accordance with the present inventions.

Turning to FIG. 8 there is shown an embodiment of a direct contact heat exchanger reactor 800. The reactor 800 has light weight fluid inlet 802a and outlet 802b, a heavy weight fluid inlet 801a and outlet 801b, and a mixer 810. Direct contact heat exchangers are unique because they are designed such that the two heat exchange materials are in direct contact with one another. There are no barriers preventing the two materials from mixing, thus the materials used are usually immiscible in one another, or they are in different phases. Most commonly these heat exchangers are gas-liquid based designs, but they can also be two immiscible liquids, solid-liquid, or solid-gas. The first fluid, the second fluid or both can be or contain the reactants, e.g., reaction fluids.

Figure 9:
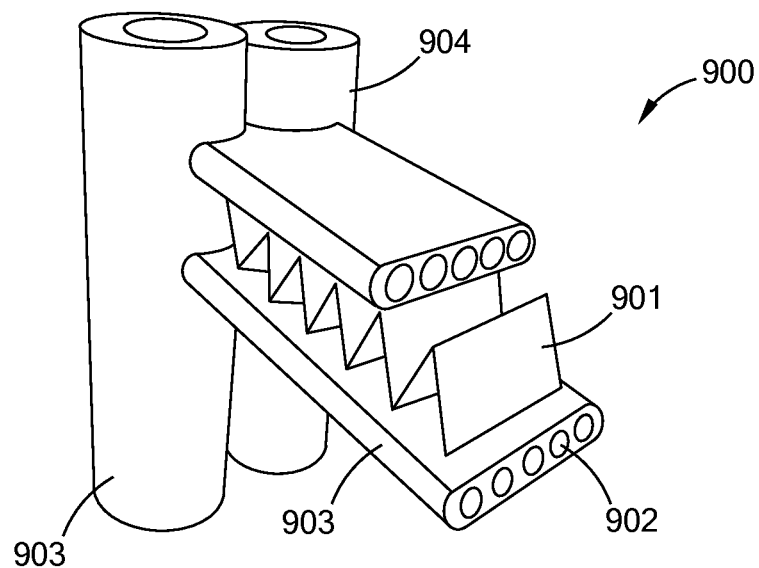
FIG. 9 is a perspective view of an embodiment of a microchannel heat exchanger for use in accordance with the present inventions.

Turing to FIG. 9 there is shown an embodiment of a microchannel heat exchanger reactor 900. The microchannel reactor 900 has at least one of the fluids flowing through channels which are below 1 mm in diameter. The reactor 900 has clad fins 901, microchannels 902, and extruded section 903, and a header 904. The first fluid, the second fluid or both can be or contain the reactants, e.g., reaction fluids. The physical design of these heat exchangers can mirror most conventionally sized heat exchangers. The advantages and limitations of microchannel heat exchangers typically follow those of the conventional sized heat exchanger their design is based on.

Figure 10:
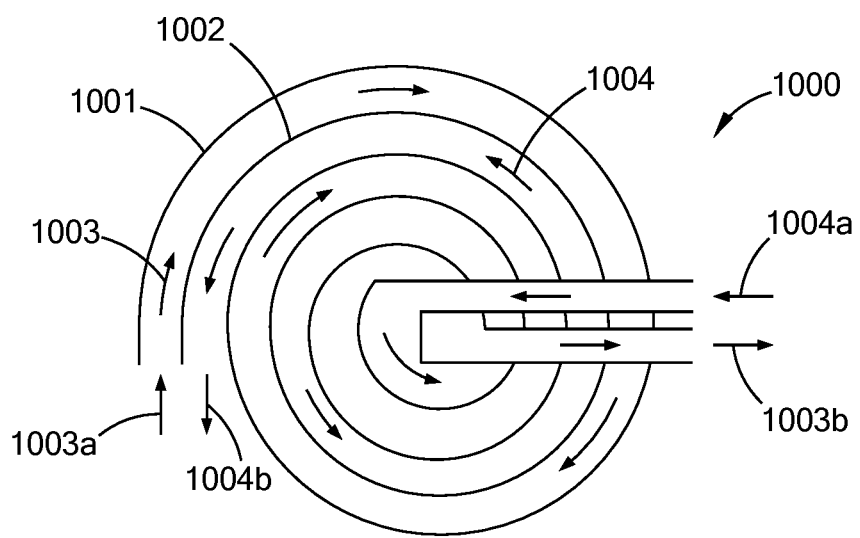
FIG. 10 is a cross sectional view of an embodiment of a spiral heat exchanger for use in accordance with the present inventions.

Turing to FIG. 10 there is shown an embodiment of a spiral heat exchanger reactor 1000. Spiral heat exchangers are made from the rolling of two long sheets of metal 1001, 1002, to form a series of channels, 1003, 1004. Channel 1003 has inlet 1003a and outlet 1003b. Channel 1004 has inlet 1004a and outlet 1004b. One fluid can flow through channel 1003 and another can flow through channel 1004. Typically, they function similarly to a plate heat exchanger, except the plates are alternating circularly around a central point. The channel edges are welded shut to a backing plate so that there is no mixing of the two fluids. Heat exchange occurs through the walls of the spiral wound material that separates the two fluids. The first fluid, the second fluid or both can be or contain the reactants, e.g., reaction fluids. Spiral heat exchangers can be set up in either co- or counter-current configurations, and due to their design, have high resistance to fouling. Much like the plate based heat exchangers, spiral heat exchangers have small footprints and allow for high heat exchange.

Figure 11:
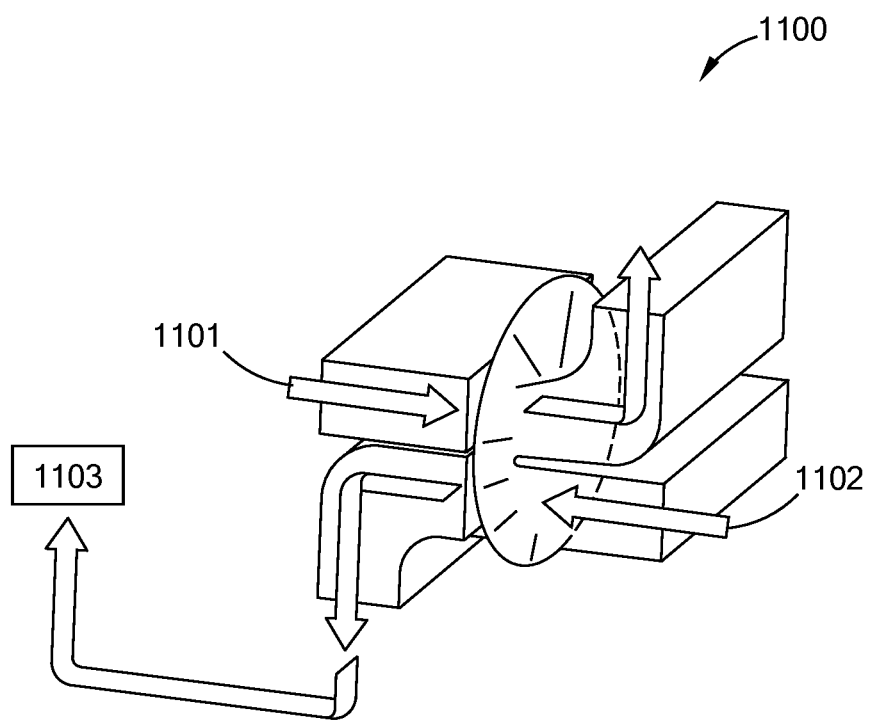
FIG. 11 is a prospective schematic of an embodiment of a regenerative heat exchanger for use in accordance with the present inventions.

Turning to FIG. 11 there is shown a regenerative heat exchanger reactor 1100. The reactor 1100 has a cold fluid path 1101 and a hot fluid path 1102, which feeds an external process 1103. Typically a regenerative heat exchanger utilizes an intermediate heat storage medium to store heat from the hot fluid temporarily until it is used to heat up the cold fluid. There are multiple types of heat exchangers, three of which are the fixed matrix, rotary, and micro scale regenerative heat exchangers. A fixed matrix heat exchanger uses a single fluid stream that flows counter-current to the cold stream. A rotary setup uses a heat storage matrix which continuously rotates between the two counter-current flowing streams. The hot fluid, the cold fluid or both can be or contain the reactants, e.g., reaction fluids. A micro scale regenerative heat exchanger uses a series of micro-scale composite openings, half of which is made of a high thermal conductivity material while the other half is made of a low thermal conductivity material, where the fluids flow through.

Figure 12:
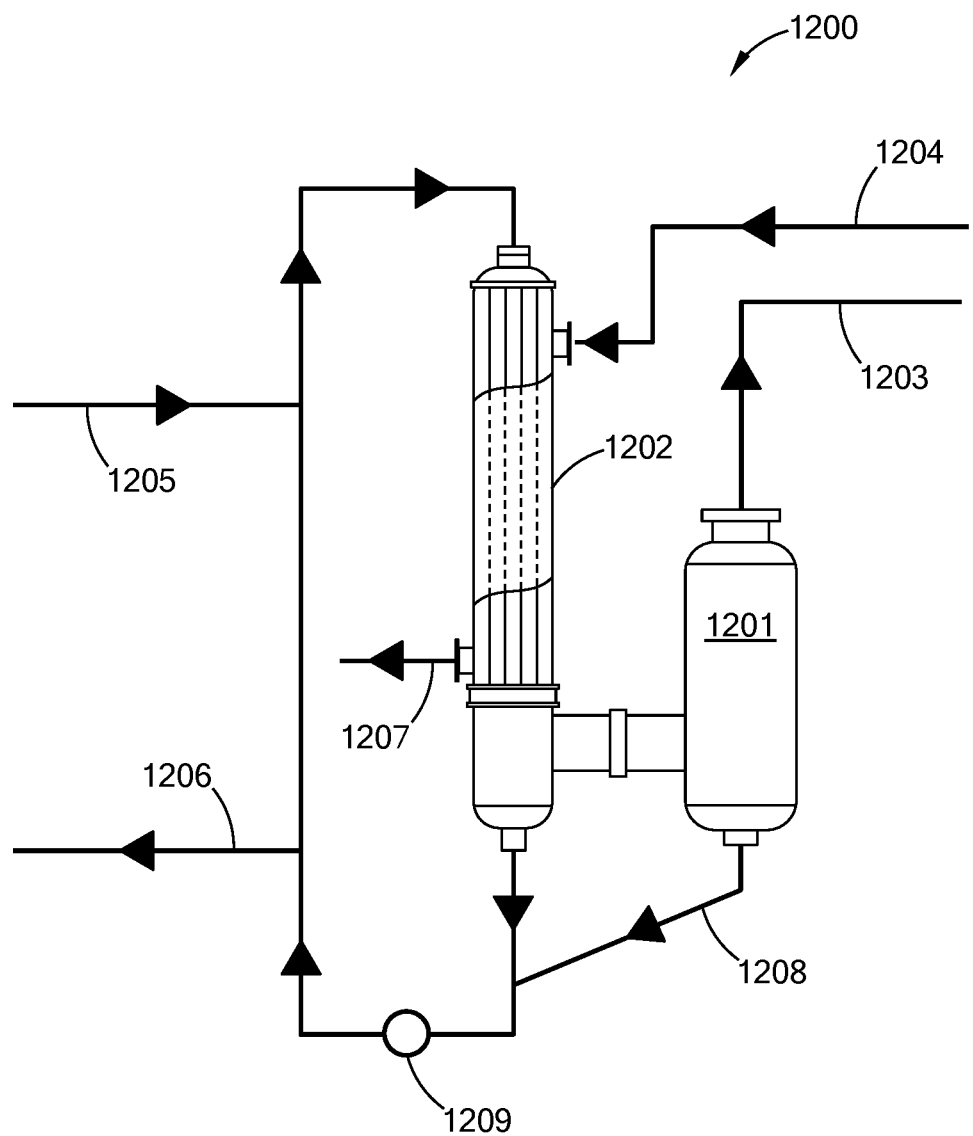
FIG. 12 is a schematic of an embodiment of a falling film heat exchanger for use in accordance with the present inventions.

Turning to FIG. 12 there is shown an embodiment of a falling film evaporator reactor 1200. The reactor 1200 having a vapor head 1201, a falling film heater assembly 1202, and a circulation pump 1209. These components are in connected by conduits that define a series flow paths: heating system 1204, vapor 1203, feed liquor 1205, concentrate 1206, condensate 1207, and concentrate 1208. Typically, falling film evaporator heat exchangers are designed to exchange enough heat between two fluids to vaporize one of the materials. Falling film heat exchangers are columns can be oriented either vertically or horizontally, and evaporation can occur on either the interior or exterior of the evaporator. They operate by allowing a film of fluid to fall down the column walls while the opposite side of the evaporator is heated. Heat exchange takes place through the evaporator column and the target fluid is vaporized. Typically the feed liquor is the reaction fluid.

Figure 13:
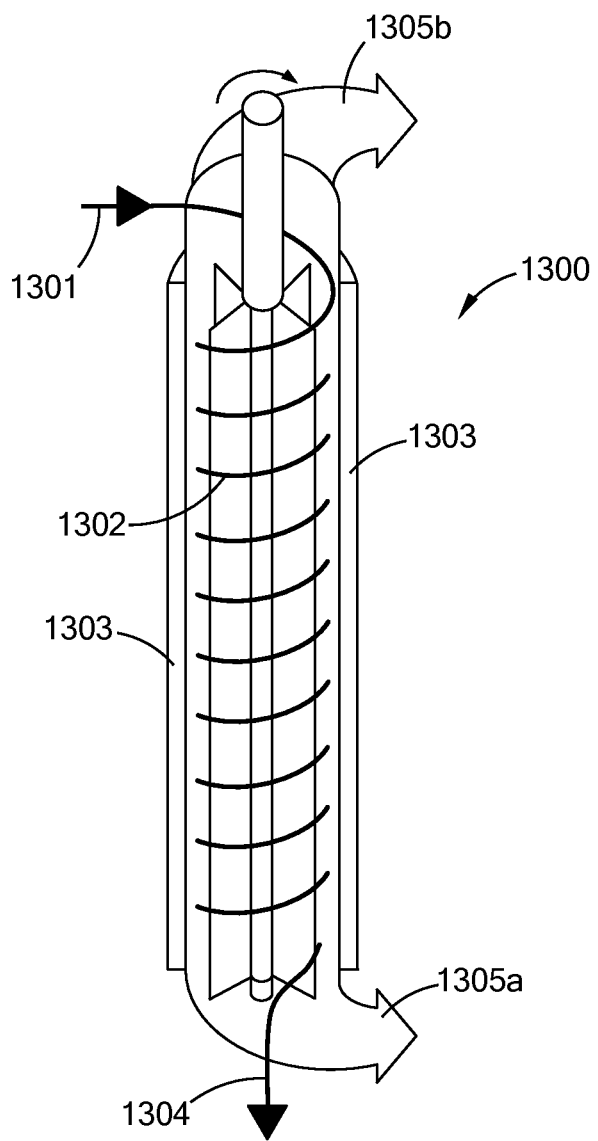
FIG. 13 is a schematic of an embodiment of a wiped film heat exchanger for use in accordance with the present inventions.

Turning to FIG. 13 there is shown an embodiment of a wiped film heat exchanger reactor 1300. The reactor 1300 utilize a moving series of blades to maintain constant heat exchange throughout the entire period of operation. The reactor 1300 has an infeed 1301 for the reaction fluid, a reaction flow path 1302, and a product output 1304. The reactor 1300 has a rotor 1305, a heating jacket 1303, and vapor countercurrent outlets, 1305a, 1305b. Typically, they consist of a heated cylindrical body that is typically vertically mounted, and a rotating shaft seated parallel to this body which has blades mounted on it. The product and heat exchange fluid are introduced co- or counter-currently and the shaft spins to remove any material that may adhere to the wall, and also to create turbulent flow. Heat exchange occurs between the materials through the wall of the heated jacket. Wiped film heat exchangers allow for improved heat exchange when working with materials that are viscous or tend to foul heavily.

Additional types of heat exchanger reactors would include agitated film heat exchange reactors.

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions. The percentages used in the examples, unless expressly provided otherwise, are weight percents of the total, e.g., formulation, mixture, product, or structure. The usage X/Y or XY indicates % of X and the % of Y in the formulation, unless expressly provided otherwise. The usage X/Y/Z or XYZ indicates the % of X, % of Y and % of Z in the formulation, unless expressly provided otherwise.

Example 1

A reaction heat exchange system performs a hydrosilylation—both monomers (e.g., octadecyltrichlorosilane) and polymers (e.g., EO/PO silicone surfactants, silicone wax, etc).

Example 2

A reaction heat exchange system performs an anionic polymerization—e.g., mono-substituted silicones (e.g., contact lens), Styrene, PPE, PE, etc.

Example 3

A reaction heat exchange system performs a cationic polymerization—e.g., PIB and Polyterpenes Example 4

A reaction heat exchange system performs an emulsion polymerization.

Example 5

A reaction heat exchange system performs a ring opening polymerization—e.g., Ethylene Oxide, Caprolactone, Propiolactone, Lactide, Propylene sulfide, etc.

Example 6

A reaction heat exchange system performs an organic transformation such as: trans-esterification for e.g., Bio-Diesel; lithiations, e.g., any transformation that would start with butyl lithium, form a RLi species then react further; alcohol protection; oxidations; condensation reactions and halogenation

Example 7

Using any of the apparatus described in FIGS. 2-13, methyl-hydrogen polysiloxane and dicyclopentadiene are preheated to 40° C. in separate holding tanks. Each material is then pumped through an inline static mixer at 1.67 lb/min along with 1000 ppm Pt Ashby's catalyst in xylenes (0.0339 lb/min) into heat exchange apparatus heated to 60° C. The pump rate is adjusted to maintain a resonance time of 3-6 minutes in the heat exchange apparatus containing mixing zones. The product is produced in a quantitative yield from the equipment. Optionally, a second heat exchange apparatus can be used to cool the material to 25° C. for further processing or packaging.

Example 8

Using any of the apparatus described in FIGS. 2-13, n-octylhexamethylcyclotetrasiloxane and sym-tetramethyldisiloxane are preheated to 40° C. in separate holding tanks. Each material is pumped in a 20:1 (n-octylhexamethylcyclotetrasiloxane:sym-tetramethyldisiloxane) ratio through an inline static mixer along with 1% sulfuric acid into a heat exchange apparatus, containing mixing zones, heated to 80° C. The pump rate is adjusted to maintain a resonance time of 60 min. After cooling to room temperature and filtration through celite, a mixture of cyclosiloxanes and linear polymers is obtained in a quantitative yield. The linear polymers have an approximate formula of $HMe_2SiO(Me_2SiO)_{40}(OctylMeSiO)_{40}SiMe_2H$ can be obtained through further processing.

Example 9

Using any of the apparatus described in FIGS. 2-13, C30+ alpha olefin and silicon hydride functional fluid are preheated to 80-90° C. in separate holding tanks. Each material is pumped, at appropriate ratios, combined with platinum catalyst (10 ppm Pt Ashby's in xylene) via an inline static mixer, through a heat exchange apparatus maintaining temperature below 100° C. The resonance time in the heat exchange is 0.5-2.5 hours. After cooling to room temperature a solid wax product is formed.

Example 10

Using any of the apparatus described in FIG. 2-13, a 50% solids allyl initiated and methyl terminated 50:50 mole:mole Ethylene Oxide:Propylene oxide copolymer with an average molecular weight of 2000 in isopropanol and a methyl-hydrogen dimethyl silicon copolymer, having 0.012 equiv of SiH, are preheated to 45° C. in separate holding tanks. Each material is pumped through an inline static mixer at a 1.25:1 EO/PO copolymer:silicone ratio and combined with platinum catalyst (10 ppm Pt Ashby's catalyst in xylene) before entering a heat exchange apparatus. The resonance time in the heat exchange apparatus is 10-60 min. The crude product is further processed to remove isopropanol to produce a viscous poly(EO/PO)methyl-dimethyl copolymer.

Example 11

A 16 feet long copper tube with an ID of 4 mm was coiled to a series of 2 helices of about 4 centimeter in diameter. To accommodate the limited space of the water bath, the copper tube between the two helices was bent to have the two helices parallel to each other. After cleaning with xylene and dried, the helices were submerged into a water bath containing about 5 gallons of water. The two ends of the copper tube was arranged to be above the water level. One end of the copper tube was connected to a 3 feet long tube, e.g., Tygon® tube, to serve as to feed a reaction solution. The other end of the copper tube was extended outside the water bath and to a beaker to collect the reaction products. The beaker was set on a balance to record weight changes for a production rate calculation. The Tygon® tube was inserted through a Peristaltic pump and the other end of the tube was immersed in a beaker containing reaction solution. The reaction solution was made by mixing 100 g methylhydrogen, TSF484 from Momentive Performance Materials, Inc., 100 g dicyclopentadiene, Ultrene 99 from Cymetech™, and 1.0 g of a solution of Ashby's catalyst in xylene containing 1000 ppm platinum. An overhead mixer with a large propeller, about 3 inches in diameter, was used to create sufficient water flow to keep water temperature relatively homogeneous throughout the bath.

The bath was filled with 45° C. water and the mixer was turned on. The bath water was maintained at 45+/−1° C. throughout the experiment. The Peristaltic pump was turned on to feed reaction solution into the copper tube. After the tube was filled with the reaction solution and pump rate was stabilized, the balance was zeroed and the weight changes were timed to calculate the production rate. At production rate of 3.15 g per minute, the residence time in the copper tube was about 20 minutes. A sample from the outlet of the copper tube revealed a conversion of Si—H to Si—C of 29.7% at such production rate.

Example 12

Using any of the apparatus described in FIGS. 2-13, a solution of methanol and stannous 2-ethylhexanoate are dissolved in xylenes at 60 C. The initiator/catalyst ratio can range from 1 to 50 to control molecular weight. This solution is then mixed via static mixing with caprolactone and injected into a second heat exchange reactor at 100 C. The resonance time in the reactor is 4-6 hours. Finally, the reaction solution is introduced into a 3rd heat exchange reactor reducing the temperature to 0 C. The product is collected via filtration and dried.

Overview—Polysilocarb Formulations & Materials

Formulations and compositions for various polysilocarbs are taught and disclosed in U.S. Pat. Nos. 9,499,677, 9,481,781 and US Patent Publication Nos. 2014/0274658, 2014/0323364, 2015/0175750, 2016/0207782, 2016/0280607, 2017/0050337, the entire disclosure of each of which are incorporated herein by reference.

The reactions and the starting materials setforth in this overview section can be used in embodiments of heat exchanger based reactions, apparatus and systems. The precursors setforth in this overview can be reacted using the heat exchanger reactors as the heat exchanger reactions of the present inventions.

General Processes for Obtaining a Polysilocarb Precursor

Typically, polymer derived ceramic precursor formulations, and in particular, polysilocarb precursor formulations, can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms, i.e., process types, are not, and should not be viewed as, limiting. For example, the reaction type process can be used to create a precursor material that is then used in the mixing type process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end, and final products. Depending upon the specific process and desired features of the product, the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

The precursor formulations may be used to form a "neat" material (by "neat" material it is meant that all, and essentially all of the structure is made from the precursor material or unfilled formulation; and thus, for example, there are no fillers or reinforcements). The precursor formulations may be used to form a filled material, e.g., having an additive or other material in addition to the precursors. They may be used to form composite materials, e.g., structures or coatings having other materials such as reinforcements in them. They may be used to form non-reinforced materials, which are materials that are made of primarily, essentially, and preferably only from the precursor materials, e.g., minimally filled materials where the filler is not intended to add or enhance strength, and unfilled materials. They may be sued to form reinforced materials, for example materials having fibers or other materials to add strength, abrasion resistance, durability, or other features or properties, that generally are viewed as strength related in a broad sense.

In general, types of filler material include, for example: inert fillers, such as inorganic materials that do not react with the SiOC matrix during curing, pyrolysis or use; reactive fillers, such as zirconium, aluminum hydroxide, and boron compounds that react with the SiOC matrix during curing, pyrolysis, use, or combinations of these; and, active fillers, such as materials that are released during the use of the end product to provide specific features to that product, e.g., lubricant. A filler may come under more than one of these types.

The filler material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. For example, organometallic, metal halide (chloride, bromide, iodide), metal alkoxide and metal amide compounds of transition metals can be copolymerized in the silica matrix, through incorporation into a precursor formulation.

The filler material can impart, regulate or enhance, features and properties, for example, electrical resistance, magnetic capabilities, band gap features, p-n junction features, p-type features, n-type features, dopants, electrical conductivity, semiconductor features, anti-static, optical properties (e.g., reflectivity, refractivity and iridescence), chemical resistivity, corrosion resistance, wear resistance, abrasions resistance, thermal insulation, UV stability, UV protective, and other features or properties that may be desirable, necessary, and both, in the end product or material.

Thus, filler materials could include copper lead wires, thermal conductive fillers, electrically conductive fillers, lead, optical fibers, ceramic colorants, pigments, oxides, dyes, powders, ceramic fines, polymer derived ceramic particles, pore-formers, carbosilanes, silanes, silazanes, silicon carbide, carbosilazanes, siloxane, metal powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, polymer derived ceramic particles, e.g., fines or beads, can be added to a polysilocarb formulation and then cured to form a filled cured plastic material, which has significant fire resistant properties as a coating or in a device or component of a device.

The polysilocarb precursor formulations may be used with reinforcing materials to form composite layers or coatings. Thus, for example, the formulation may be flowed into, impregnated into, absorbed by or otherwise combined with a thin reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 37.8° C. (100° F.) to about 204.4° C. (400° F.), the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber, cured into a solid, pyrolized into a ceramic, or it may be made from a different precursor formulation material, which has been formed into a fiber, pyrolized into a ceramic and combinations and variations of these. In addition to ceramic fibers derived from the precursor formulation materials that may be used as reinforcing material, other porous, substantially porous, and non-porous ceramic structures derived from a precursor formulation material may be used.

The polysilocarb material (e.g., precursor batch, precursor, formulation, bulk liquid, etc.), can have various inhibitors, catalysts and initiator present that inhibit, regulate, or promote curing, under predetermined conditions. Thus, the polysilocarb coating material can have sufficient inhibitors present, or the absence of a catalyst, to provide the required shelf life for the material in storage.

The Mixing Type Process

Precursor materials may be a methyl hydrogen (methyl terminated hydride substituted polysiloxane), methyl hydrogen fluid (methyl terminated hydride methyl substitute polysiloxane, with little to no dimethyl groups) and substituted and modified methyl hydrogens, siloxane backbone materials, siloxane backbone additives, reactive monomers, reaction products of a siloxane backbone additive with a silane modifier or an organic modifier, and other similar types of materials, such as silane based materials, silazane based materials, carbosilane based materials, non-silicon based organic cross linkers, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol (which may be obtained from ALDRICH), Octamethylcyclotetrasiloxane (which may be viewed as a dilutant), and tetramethyltetravinylcyclotetrasiloxane, may be added to the polysilocarb precursor formulation, e.g., to form an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a cured material or structure.

The catalyst can be any platinum (Pt) based catalyst, which can, for example, be diluted to ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 Cat a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst. Transition metal catalysis, such as Fe catalysis, Ni catalysis, and Co catalysis, that for example are used in the growth of ordered and highly ordered carbon structures, such as carbon nanotubes, can also be used.

Further, custom and specific combinations of these and other catalysts may be used, such that they are matched to specific formulations, and in this way selectively and specifically catalyze the reaction of specific constituents. Moreover, the use of these types of matched catalyst-formulations systems, as well as, process conditions, may be used to provide predetermined product features, such as for example, pore structures, porosity, densities, density profiles, high purity, ultra high purity, and other morphologies or features of cured structures or materials, and in some instances the ceramics that are formed from the cured structures or materials.

In this mixing type process for making a precursor formulation, preferably chemical reactions or molecular rearrangements only take place during the making of the raw starting materials, the curing process, and in the pyrolizing process. Preferably, in the embodiments of these mixing type of formulations and processes, polymerization, cross-linking or other chemical reactions take place primarily, preferably essentially, and more preferably solely during the curing process.

The precursor may be a methyl terminated hydride substituted polysiloxane, which can be referred to herein as methyl hydrogen (MH), having the formula shown below.

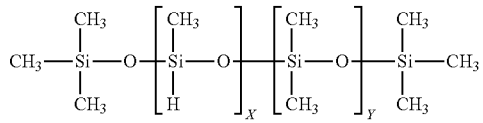

The MH, for example, may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be any of the following linear siloxane backbone materials.

The precursor may be a vinyl substituted polydimethyl siloxane, which formula is shown below.

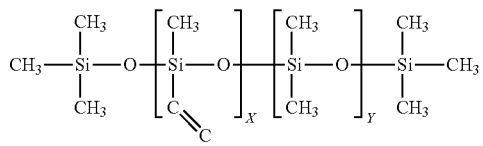

This precursor, for example, may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to increase cross-link density and improve toughness, as well as, other features and characteristics to the cured preform and ceramic material.

The precursor may be a vinyl substituted and vinyl terminated polydimethyl siloxane, which formula is shown below.

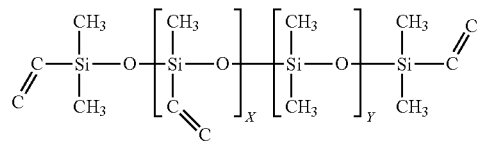

This precursor, for example, may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a vinyl substituted and hydrogen terminated polydimethyl siloxane, which formula is shown below.

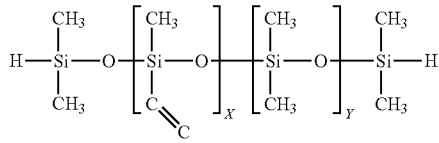

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be an allyl terminated polydimethyl siloxane, which formula is shown below.

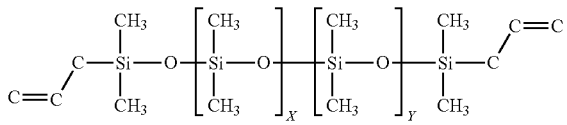

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a vinyl terminated polydimethyl siloxane (VT), which formula is shown below.

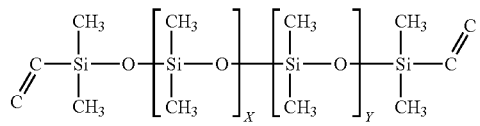

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a silanol (hydroxy) terminated polydimethyl siloxane, which formula is shown below.

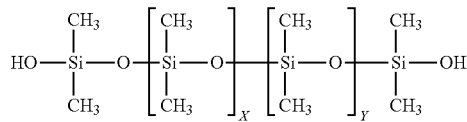

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a silanol (hydroxy) terminated vinyl substituted dimethyl siloxane, which formula is shown below.

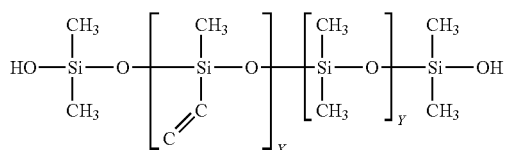

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a hydrogen (hydride) terminated polydimethyl siloxane, which formula is shown below.

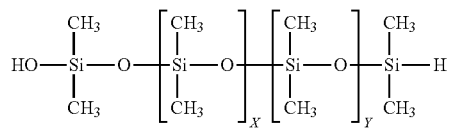

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

The precursor may be a di-phenyl terminated siloxane (which may also be referred to as phenyl terminated), which formula is shown below.

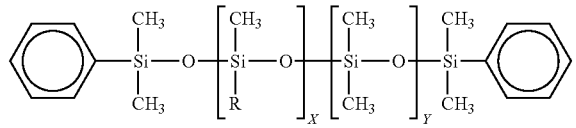

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a mono-phenyl terminated siloxane (which may also be referred to as trimethyl terminated, phenyl terminated siloxane), which formulas are shown below.

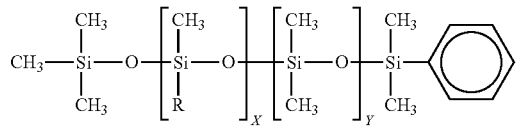

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a diphenyl dimethyl polysiloxane, which formula is shown below.

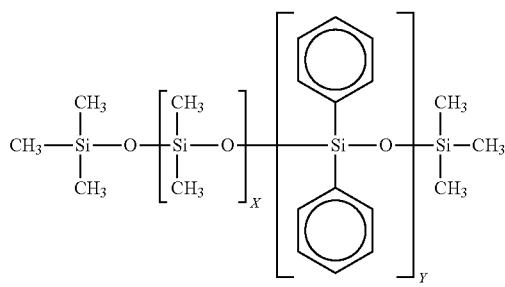

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a vinyl terminated diphenyl dimethyl polysiloxane, which formula is shown below.

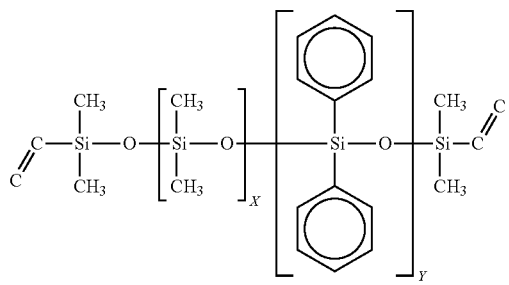

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a hydroxy terminated diphenyl dimethyl polysiloxane, which formula is shown below.

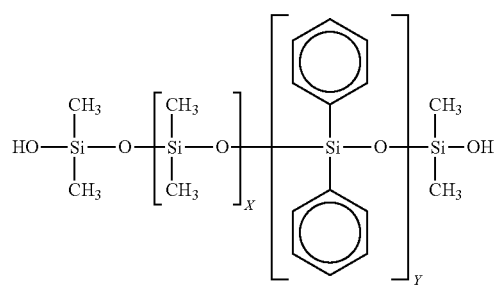

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

This precursor may be a methyl terminated phenylethyl polysiloxane, (which may also be referred to as styrene vinyl benzene dimethyl polysiloxane), which formula is shown below.

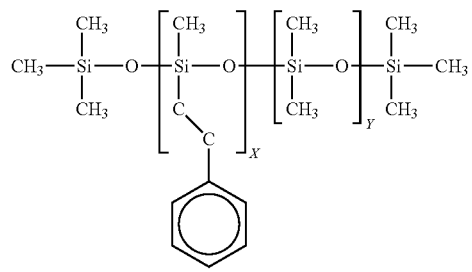

This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

The forgoing linear siloxane backbone materials, are by way of example, and it is understood that other similar linear siloxane backbone materials can also be used as precursors. More complex linear and branched siloxane backbone materials may be used as precursors, but are not preferred.

A variety of cyclosiloxanes can be used as precursors, and are reactive molecules, in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is >=1, and x+y is from 3-8. Further, in this nomenclature system—D represents —SiO$_2$ groups, typically Me$_2$SiO$_2$, Q represents SiO$_4$, T represents —SiO$_3$ groups, typically MeSiO$_3$ and M represent —SiO groups, typically Me$_3$SiO.

The precursor batch may also: (i) contain non-silicon based precursors, such as non-silicon based cross-linking agents; (ii) be the reaction product of a non-silicon based cross linking agent and a silicon based precursor; and, (iii) combinations and variation of these. The non-silicon based cross-linking agents are intended to, and provide, the capability to cross-link during curing. For example, non-silicon based cross-linking agents include: cyclopentadiene (CP), methylcyclopentadiene (MeCP), dicyclopentadiene (DCPD), methyldicyclopentadiene (MeDCPD), tricyclopentadiene (TCPD), piperylene, divnylbenzene, isoprene, norbornadiene, vinylnorbornene, propenylnorbornene, isopropenylnorbornene, methylvinylnorbornene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, or other Si bond in a precursor, can be used as a cross-linking agent. Some organic materials containing oxygen, nitrogen, and sulphur may also function as cross-linking agents.

The amount of the non-silicon based cross-linking agent to the silicon based precursor can be from about 10% to 90% non-silicon based cross-linker to 10% to 90% silicon based precursor (preferably a silicon backbone, e.g., —Si—O— backbone, material). Thus, the ranges of amounts can be, for example: DCPD/MHF from 10/90 to 90/10, about 40/60 to 60/40, about 50/50, and combinations and variations of these ratios, as well as other ratios. A third and fourth precursor material may also be used. Thus, the ratio of non-silicon cross linker/silicon backbone precursor/third precursor, can be: form about 10% to about 80% non-silicon based cross linker; from about 10% to 80% silicon based precursor: and form about 0.1% to 40% third precursor. The ranges and amounts can be, for example: DCPD/MHF/3rd precursor from about 10/20/70 to 70/20/10, from about 10/20/70 to 10/70/20, from about 45/55/10 to about 55/45/10, from about 40/55/5 to about 55/40/5 and combinations and variations of these ratios as well as other ratios.

The precursor may be a reactive monomer. These would include molecules, such as tetramethyltetravinylcyclotetrasiloxane (TV), which formula is shown below.

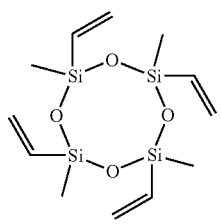 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

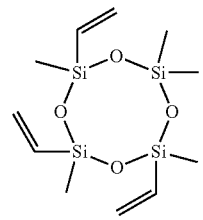 [SMILES: C=C[Si]1(C)O[Si](C)(C)O[Si](C)(C=C)O[Si](C)(C=C)O1]

divinyl cyclotetrasiloxane,

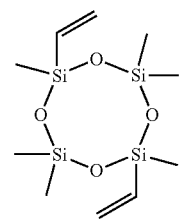

trivinyl monohydride cyclotetrasiloxane,

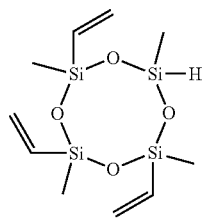

divinyl dihydride cyclotetrasiloxane,

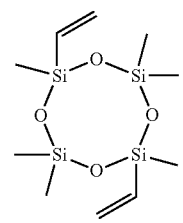

and a hexamethyl cyclotetrasiloxane, such as,

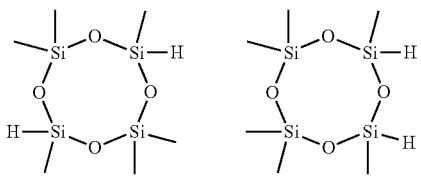

The precursor may be a silane modifier, such as vinyl phenyl methylsilane, diphenylsilane, diphenylmethylsilane, and phenylmethylsilane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenylmethylsilane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances. The precursor may be a partially hydrolyzed tertraethyl orthosilicate, such as TES 40 or Silbond 40. The precursor may also be a methylsesquisiloxane such as SR-350 available from Momentive (previously from General Electric Company, Wilton, Conn.). The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

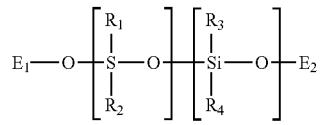

Wherein end cappers $E_1$ and $E_2$ are chosen from groups such as trimethylsiliy (trimethyl silicon) (—Si(CH$_3$)$_3$), dimethylsilyl hydroxy (dimethyl silicon hydroxy) (—Si(CH$_3$)$_2$OH), dimethylhydridosilyl (dimethyl silicon hydride) (—Si(CH$_3$)$_2$H), dimethylvinylsilyl (dimethyl vinyl silicon) (—Si(CH$_3$)$_2$(CH═CH$_2$)), dimethylphenylsily (—Si(CH$_3$)$_2$(C$_6$H$_5$)) and dimethylalkoxysilyl (dimethyl alkoxy silicon) (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(—C), ethyl (—C—C), vinyl (—C═C), alkyl (—R)(C$_n$H$_{2n+1}$), allyl (—C—C═C), aryl ('R), phenyl (Ph) (—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$).

In general, embodiments of formulations for polysilocarb formulations may, for example, have from about 0% to 50% MHF, about 20% to about 99% MHF, about 0% to about 30% siloxane backbone material, about 20% to about 99% siloxane backbone materials, about 0% to about 70% reactive monomers, about 0% to about 95% TV, about 0% to about 70% non-silicon based cross linker, and, about 0% to about 90% reaction products of a siloxane backbone additives with a silane modifier or an organic modifier reaction product.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation.

This precursor formulation is then cured into a preform, i.e., plastic, cured solid or semi-solid material, through a hydrolysis reaction. The condensation reaction forms a polymer of the type shown below.

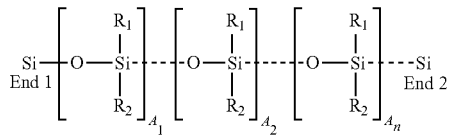

Where $R_1$ and $R_2$ in the polymeric units can be a hydride (—H), a methyl (Me)(—C), an ethyl (—C—C), a vinyl (—C=C), an alkyl (—R)($C_nH_{2n+1}$), an unsaturated alkyl (—$C_nH_{2n-1}$), a cyclic alkyl (—$C_nH_{2n-1}$), an allyl (—C—C=C), a butenyl (—$C_4H_7$), a pentenyl (—$C_5H_9$), a cyclopentenyl (—$C_5H_7$), a methyl cyclopentenyl (—$C_5H_6(CH_3)$), a norbornenyl (—$C_xH_y$, where X=7-15 and Y=9-18), an aryl ('R), a phenyl (Ph)(—$C_6H_5$), a cycloheptenyl (—$C_7H_{11}$), a cyclooctenyl (—$C_8H_{13}$), an ethoxy (—O—C—C), a siloxy (—O—Si—$R_3$), a methoxy (—O—C), an alkoxy, (—O—R), a hydroxy, (—O—H), a phenylethyl (—C—C—$C_6H_5$) a methyl,phenyl-ethyl (—C—C(—C)(—$C_6H_5$)) and a vinyl-phenyl-ethyl (—C—C($C_6H_4$(—C=C))). $R_1$ and $R_2$ may be the same or different. The custom precursor polymers can have several different polymeric units, e.g., $A_1$, $A_2$, $A_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane. an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silane of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others.

Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene (DCPD). Using the reactive blending process a MHF/DCPD polymer is created and this polymer is used as a precursor formulation. It can be used alone to form a cured or pyrolized product, or as a precursor in the mixing or reaction processes.

Thus, for example, from about 40 to 90% MHF of known molecular weight and hydride equivalent mass; about 0.20 wt % P01 catalyst; and from about 10 to 60% DCPD with 83% purity, can be used.

P01 is a 2% Pt(0) tetravinylcyclotetrasiloxane complex in tetravinylcyclotetrasiloxane, diluted 20× with tetravinylcyclotetrasiloxane to 0.1% of Pt(0) complex. In this manner 10 ppm Pt is provided for every 1% loading of bulk cat.

In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% (by weight of the MHF) of P01 Platinum catalyst is added to the MHF in the reaction vessel. Typically, upon addition of the catalyst, bubbles will form and temperature will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temperature stays above 80° C. for a minimum total of about 2 hours and a maximum total of about 4 hours. After 2-4 hours above 80° C., the heater is turn off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table A sets forth various embodiments of precursor materials.

1 molar equivalent of vinyl functionality. "VMH" refers to methyl vinyl fluid, a linear vinyl material from the ethoxy process, which can be a substitute for TV. The numbers "0200" etc. for VT are the viscosity (e.g., 0200=200 cps) in centipoise for that particular VT.

Curing and Pyrolysis

Precursor formulations, including the polysilocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, i.e., all of the reaction has stopped, or the leveling off of the decrease in reactive groups over time, i.e., essentially all of the reaction has stopped). Thus, the material may be cured to varying degrees, depending upon its intended use and purpose. For example, in some situations the end cure and the hard cure may be the same. Curing conditions such as atmosphere and temperature may effect the composition of the cured material.

In multi-layer, or composite structures and shapes, a layer of the polysilocarb material may be cured to varying degrees, for example in a multi-layer embodiment, the layers can be green cured to promote layer adhesion, then finally cured to a hard cure. Each layer in a multi-layer structure can be cured to the same degree of cure, to different degrees of cure, subject to one, two, three or more curing steps, and combinations and variations of these.

TABLE A

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclotetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.87 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to from the polymer. "Equivalents _____/mol" refers to the molar equivalents. "Grams/mole of vinyl" refers to the amount of a given polymer needed to provide The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$ (e.g., an amount of $O_2$ lower than atmospheric, such as less than 20% $O_2$, less than 15% $O_2$, less than 10% $O_2$ less than 5% $O_2$), reduced pressure (e.g., less than atmospheric), elevated pressure (e.g., greater than atmospheric), enriched $O_2$, (e.g., an amount of $O_2$ greater than atmospheric), ambient pressure, controlled partial pressure and combinations and variations of these and other processing conditions.

In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the cured material, the ceramic and the final applications or products.

For high purity materials, the furnace, containers, handling equipment, atmosphere, and other components of the curing apparatus and process are clean, essentially free from, and do not contribute any elements or materials, that would be considered impurities or contaminants, to the cured material.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to about 90° C. Although higher and lower temperatures and various heating profiles, (e.g., rate of temperature change over time ("ramp rate", e.g., $\Delta$ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, by way of example, an —$R_1$—Si—C—C—Si—O—Si—C—C—Si—$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicon atoms. Although additional other structures and types of cured materials are contemplated. Thus, for example, use of Luperox 231 could yield a structure, from the same monomers, that was —Si—C—C—C—Si—. When other cross linking agents are used, e.g, DCPD and divinyl benzene, the number of carbons atoms between the silicon atoms will be greater than 5 atoms. A generalized formula for some embodiments of the cross-linked, e.g., cured, material, would be —Si—$R_3$—Si—, where $R_3$ would be ethyl (from for example a vinyl precursor), propyl (from for example a allyl precursor), dicyclopentane (from for example a DCPD precursor), norbornane (from for example a norbornadiene precursor), diethylbenzene (from for example a divinyl benzene precursor), and others.

During the curing process, some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing may be accomplished by any type of heating apparatus, or mechanisms, techniques, or morphologies that has the requisite level of temperature and environmental control. Curing may be accomplished through, for example, heated water baths, electric furnaces, microwaves, gas furnaces, furnaces, forced heated air, towers, spray drying, falling film reactors, fluidized bed reactors, indirect heating elements, direct heating (e.g., heated surfaces, drums, and plates), infrared heating, UV irradiation (light), an RF furnace, in-situ during emulsification via high shear mixing, in-situ during emulsification via ultrasonication, broad spectrum white light, IR light, coherent electromagnetic radiation (e.g. lasers, including visible, UV and IR), and convection heating, to name a few.

In an embodiment, curing may also occur under ambient conditions for an embodiment having a sufficient amount of catalyst.

If pyrolysis is conducted for an embodiment the cured material can be for example heated to about 600° C. to about 2,300° C.; from about 650° C. to about 1,200° C., from about 800° C. to about 1300° C., from about 900° C. to about 1,200° C. and from about 950° C. to 1,150° C. At these temperatures typically all organic structures are either removed or combined with the inorganic constituents to form a ceramic. Typically, at temperatures in the about 650° C. to 1,200° C. range the resulting material is an amorphous glassy ceramic. When heated above about 1,200° C. the material typically may from nano crystalline structures, or micro crystalline structures, such as SiC, $Si3N_4$, SiCN, β SiC, and above 1,900° C. an α SiC structure may form, and at and above 2,200° C. α SiC is typically formed. The pyrolized, e.g., ceramic materials can be single crystal, polycrystalline, amorphous, and combinations, variations and subgroups of these and other types of morphologies.

The pyrolysis may be conducted under may different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low $O_2$, gas rich (e.g., within or directly adjacent to a flame), inert, $N_2$, Argon, air, reduced pressure, ambient pressure, elevated pressure, flowing gas (e.g., sweep gas, having a flow rate for example of from about from about 15.0 GHSV (gas hourly space velocity) to about 0.1 GHSV, from about 6.3 GHSV to about 3.1 GHSV, and at about 3.9 GHSV), static gas, and combinations and variations of these.

In some embodiments, upon pyrolization, graphenic, graphitic, amorphous carbon structures and combinations and variations of these are present in the Si—O—C ceramic. A distribution of silicon species, consisting of SiOxCy structures, which result in $SiO_4$, $SiO_3C$, $SiO_2C_2$, $SiOC_3$, and $SiC_4$ are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon The pyrolysis may be conducted in any heating apparatus, that maintains the request temperature and environmental controls. Thus, for example pyrolysis may be done with, pressure furnaces, box furnaces, tube furnaces, crystal-growth furnaces, graphite box furnaces, arc melt furnaces, induction furnaces, kilns, $MoSi_2$ heating element furnaces, carbon furnaces, vacuum furnaces, gas fired furnaces, electric furnaces, direct heating, indirect heating, fluidized beds, RF furnaces, kilns, tunnel kilns, box kilns, shuttle kilns, coking type apparatus, lasers, microwaves, other electromagnetic radiation, and combinations and variations of these and other heating apparatus and systems that can obtain the request temperatures for pyrolysis.

In embodiments of the polysilocarb derived ceramic materials has any of the amounts of Si, O, C for the total amount of material that are set forth in the Table B.

TABLE B

|  | Si | | O | | C | |
| --- | --- | --- | --- | --- | --- | --- |
|  | Lo | Hi | Lo | Hi | Lo | Hi |
| Wt % | 35.00% | 50.00% | 10.00% | 35.00% | 5.00% | 30.00% |
| Mole Ratio | 1.000 | 1.429 | 0.502 | 1.755 | 0.334 | 2.004 |
| Mole % | 15.358% | 63.095% | 8.821% | 56.819% | 6.339% | 57.170% |

In general, embodiments of the pyrolized ceramic polysilocarb materials can have about 20% to about 65% Si, can have about 5% to about 50% 0, and can have about 3% to about 55% carbon weight percent. Greater and lesser amounts are also contemplated.

In general, embodiment of the pyrolized ceramic polysilocarb materials can have a mole ratio (based on total Si, O, and C) of about 0.5 to about 2.5 for Si, can have a mole ratio of about 0.2 to about 2.5 for 0, and can have a mole ration of about 0.1 to about 4.5 for C. Greater and lesser amounts are also contemplated.

In general, embodiment of the pyrolized ceramic polysilocarb materials can have a mole % (percentage of total Si, O, and C) of about 13% to about 68% for Si, can have a mole % of about 6% to about 60% for 0, and can have a mole % of about 4% to about 75% for C. Greater and lesser amounts are also contemplated.

The type of carbon present in embodiments of the polysilocarb derived ceramic pigments can be free carbon, (e.g., turbostratic, amorphous, graphenic, graphitic forms of carbon) and carbon that is bound to silicon. Embodiments of ceramic polysilocarb materials having free carbon and silicon-bound-carbon (Si—C) are set forth in Table C. Greater and lesser amounts and different percentages of free carbon and silicon-bound-carbon are also contemplated.

TABLE C

| Embodiment | % Free Carbon | % Si—C type |
| --- | --- | --- |
| 1 | 64.86 | 35.14 |
| 2 | 63.16 | 36.85 |
| 3 | 67.02 | 32.98 |
| 4 | 58.59 | 41.41 |
| 5 | 68.34 | 31.66 |
| 6 | 69.18 | 30.82 |
| 7 | 65.66 | 34.44 |
| 8 | 72.74 | 27.26 |
| 9 | 72.46 | 27.54 |
| 10 | 78.56 | 21.44 |

Generally, embodiments of polysilocarb derived ceramic materials can have from about 30% free carbon to about 70% free carbon, from about 20% free carbon to about 80% free carbon, and from about 10% free carbon to about 90% free carbon, and from about 30% Si—C bonded carbon to about 70% Si—C bonded carbon, from about 20% Si—C bonded carbon to about 80% Si—C bonded carbon, and from about 10% Si—C bonded carbon to about 90% Si—C bonded carbon. Greater and lesser amounts are also contemplated.

Metals and Metal Complexes

By way of example, metals and metal complexes that can be used as fill material would include Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); and Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alkyl complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the silicon precursor compounds and then treated with hydroxide to form the oxides at the same time as the polymer, copolymerizes. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, and about 20 mole percent or greater. The forgoing use of metals with the present precursor formulas can be used to control and provide predetermined stoichiometries.

Headings and Embodiments

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of formulations, compositions, articles, plastics, ceramics, materials, parts, uses, applications, equipment, methods, activities, and operations set forth in this specification may be used for various other fields and for various other activities, uses and embodiments. Additionally, these embodiments, for example, may be used with: existing systems, articles, compositions, plastics, ceramics, operations or activities; may be used with systems, articles, compositions, plastics, ceramics, operations or activities that may be developed in the future; and with such systems, articles, compositions, plastics, ceramics, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A method of making a polymer derived ceramic precursor, the method comprising forming a polymer derived ceramic precursor using a heat exchanger reactor.

2. The method of claim 1, wherein the polymer derived ceramic precursor comprises a polysilocarb.

3. The method of claim 2, wherein the method comprises reacting a first polysilocarb precursor with an organic crosslinking agent.

4. The method of claim 3, wherein the organic crosslinking agent is silicon free.

5. The method of claim 4, wherein the first polysilocarb precursor is methyl-hydrogen polysiloxane and the organic crosslinking agent is dicyclopentadiene.

6. A method of making a polymer derived ceramic precursor, the method comprising: preheating methyl-hydrogen polysiloxane and dicyclopentadiene to 40° C. in separate holding tanks; transferring through an inline static mixer to heat exchange reactor apparatus; adding 1000 ppm Pt Ashby's catalyst in xylenes (0.0339 lb/min) to the heat exchanger reactor apparatus; raising the temperate to 60° C.

7. The method of claim 6, wherein the heat exchanger apparatus comprises a shell and tube heat exchanger.

8. A method of making a polymer derived ceramic precursor, the method comprising:
   a. preheating n-octylhexamethylcyclotetrasiloxane and sym-tetramethyldisiloxane to 40° C. in separate holding tanks;
   b. pumping each material in a 20:1 (n-octylhexamethylcyclotetrasiloxane:sym-tetramethyldisiloxane) ratio through an inline static mixer along with 1% sulfuric acid into a heat exchanger apparatus, containing mixing zones, heated to 80° C.;
   c. wherein the pump rate is adjusted to maintain a resonance time of 60 min;
   d. cooling the reaction product to room temperature; and,
   e. filtering the reaction product through celite;
   f. whereby a mixture of cyclosiloxanes and linear polymers is obtained in a quantitative yield.

9. The method of claim 8, wherein the linear polymers have an approximate formula of $HMe_2SiO(Me_2SiO)_{40}(OctylMeSiO)_{40}SiMe_2H$.

10. The method of claim 8, wherein the heat exchanger apparatus comprises a shell and tube heat exchanger.

11. The method of claim 8, wherein the heat exchanger apparatus comprises a plate heat exchanger.

12. The method of claim 8, wherein the heat exchanger apparatus comprises a plate and shell heat exchanger.

\* \* \* \* \*